Nov. 19, 1935.  A. D'ANGELO  2,021,177
MOTOR GENERATOR AND OTHER TRANSFORMER
Original Filed March 30, 1933    8 Sheets-Sheet 1
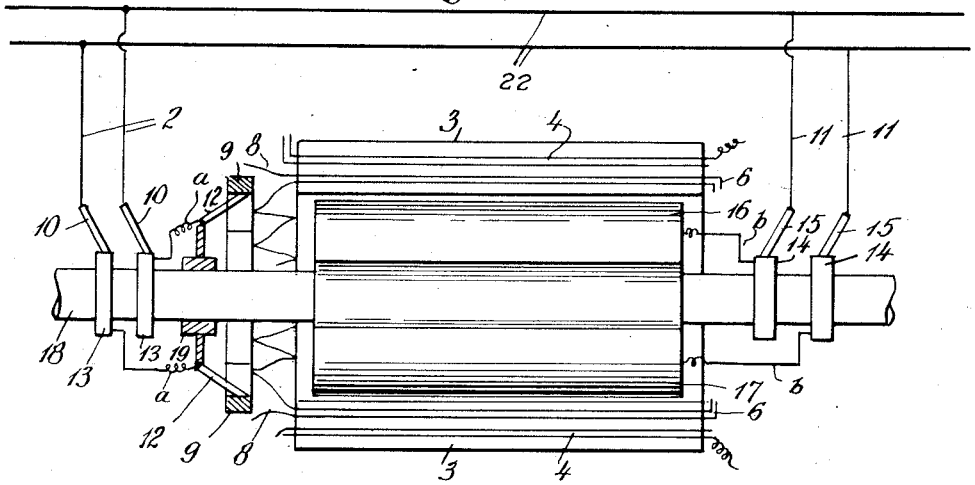
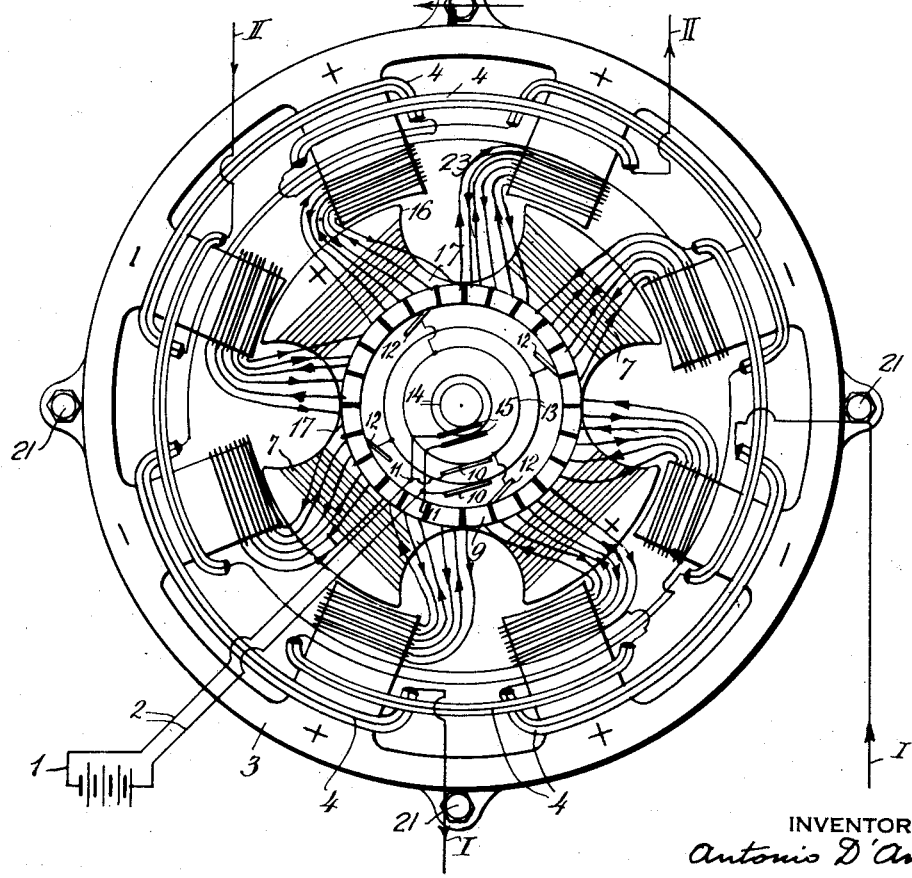
INVENTOR
Antonio D'Angelo Nov. 19, 1935.    A. D'ANGELO    2,021,177
MOTOR GENERATOR AND OTHER TRANSFORMER
Original Filed March 30, 1933    8 Sheets-Sheet 2
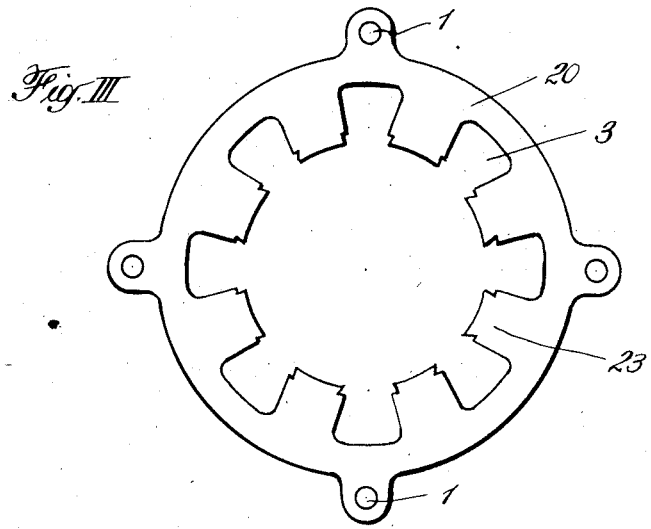
Fig. III
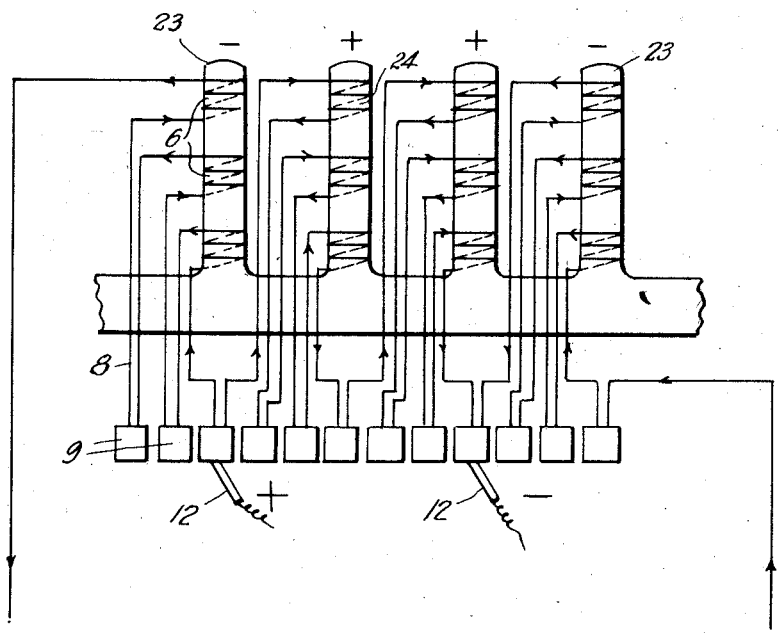
Fig. IV
INVENTOR
Antonio D'Angelo Nov. 19, 1935.  A. D'ANGELO  2,021,177
MOTOR GENERATOR AND OTHER TRANSFORMER
Original Filed March 30, 1933   8 Sheets-Sheet 3
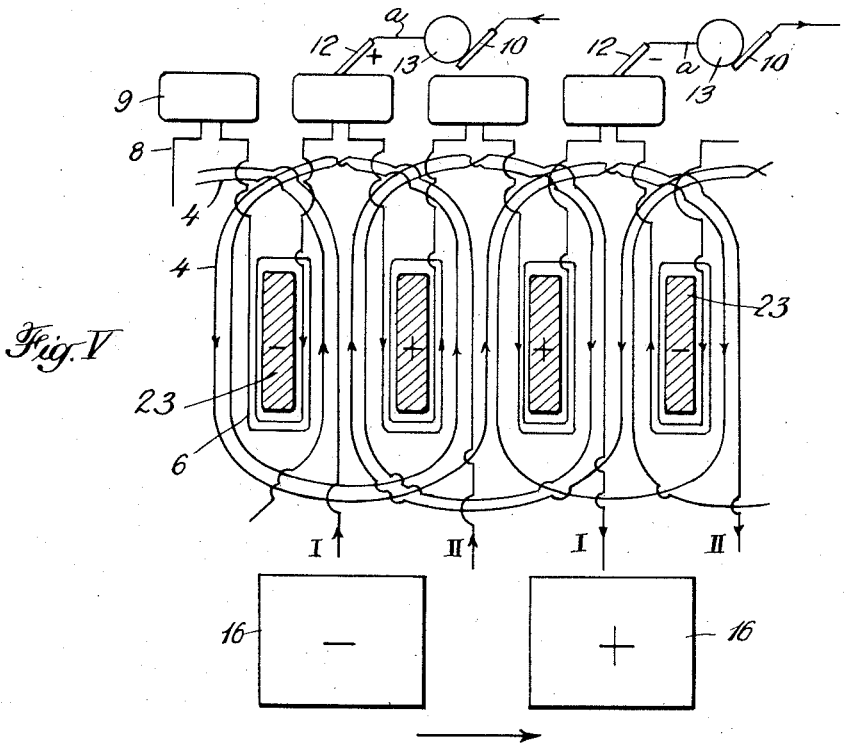
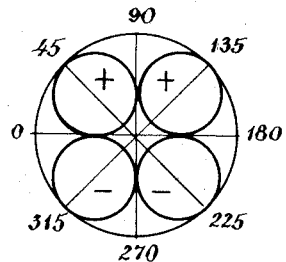
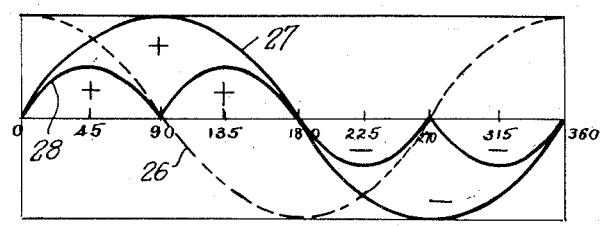
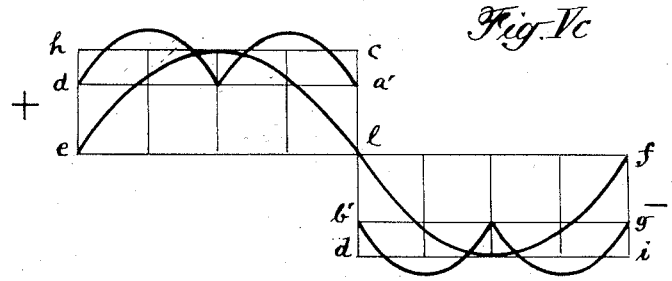
INVENTOR
Antonio D'Angelo

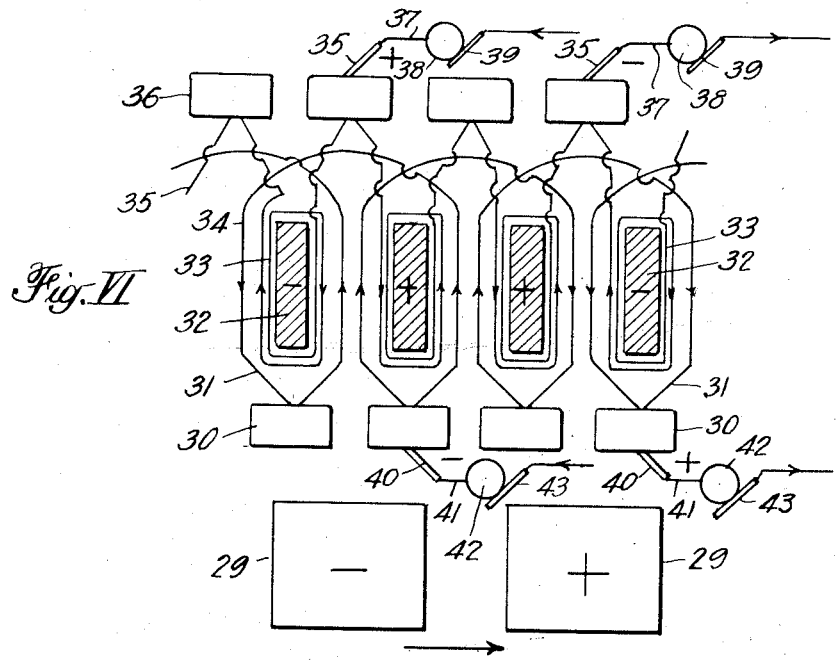
Fig. VI
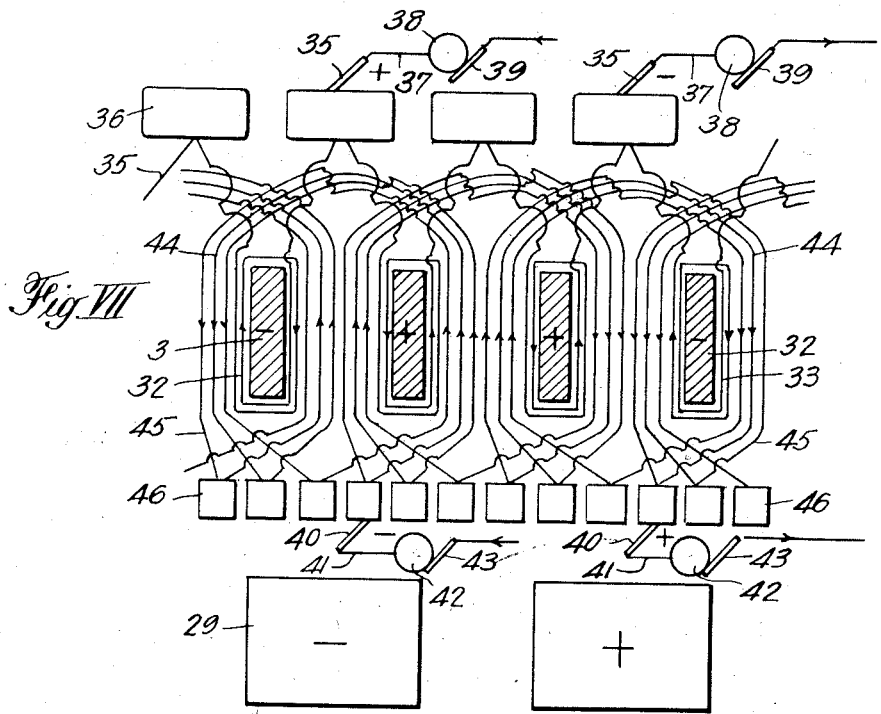
Fig. VII

Nov. 19, 1935.  A. D'ANGELO  2,021,177
MOTOR GENERATOR AND OTHER TRANSFORMER
Original Filed March 30, 1933   8 Sheets-Sheet 5
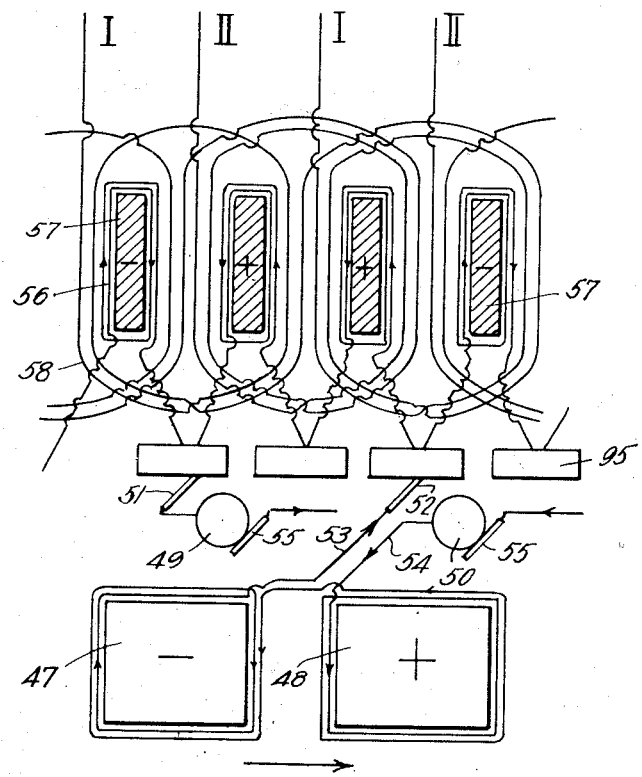
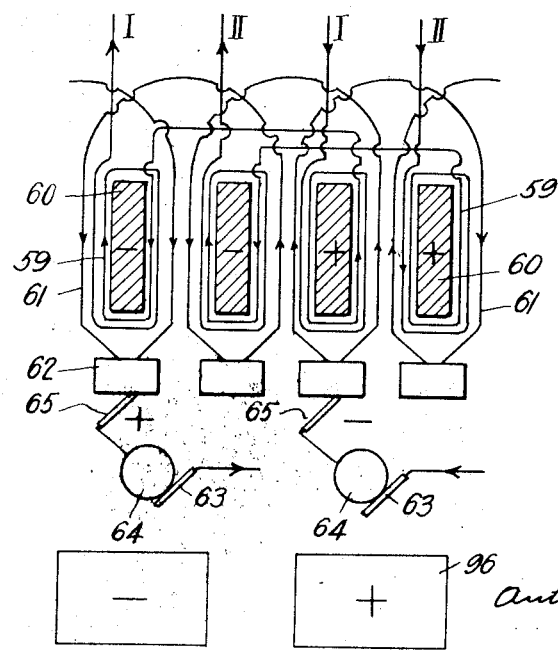
INVENTOR
Antonio D'Angelo Nov. 19, 1935.     A. D'ANGELO     2,021,177
MOTOR GENERATOR AND OTHER TRANSFORMER
Original Filed March 30, 1933    8 Sheets-Sheet 6
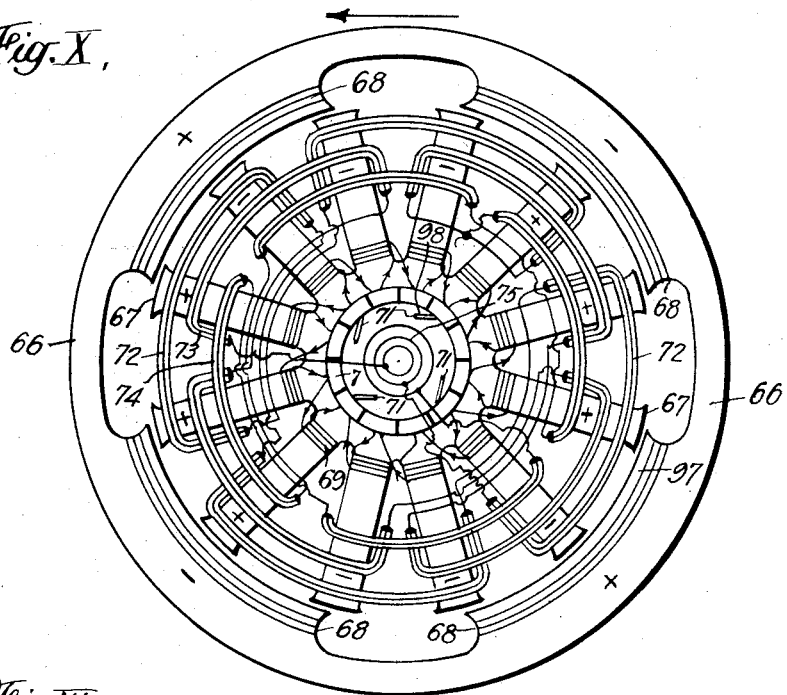
Fig. X.
Fig. XI.
INVENTOR
Antonio D'Angelo

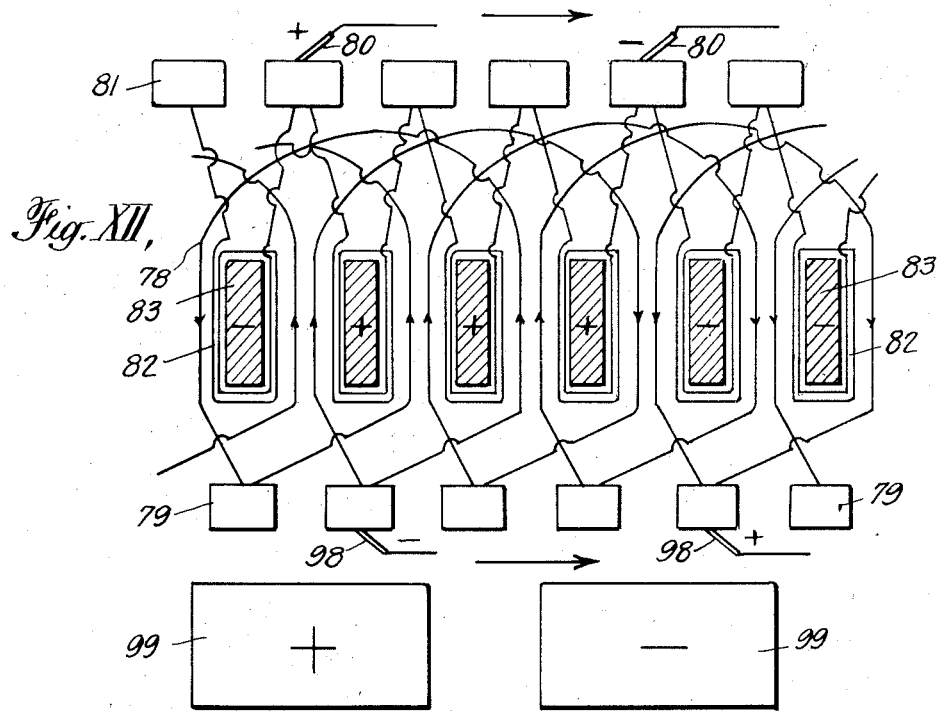
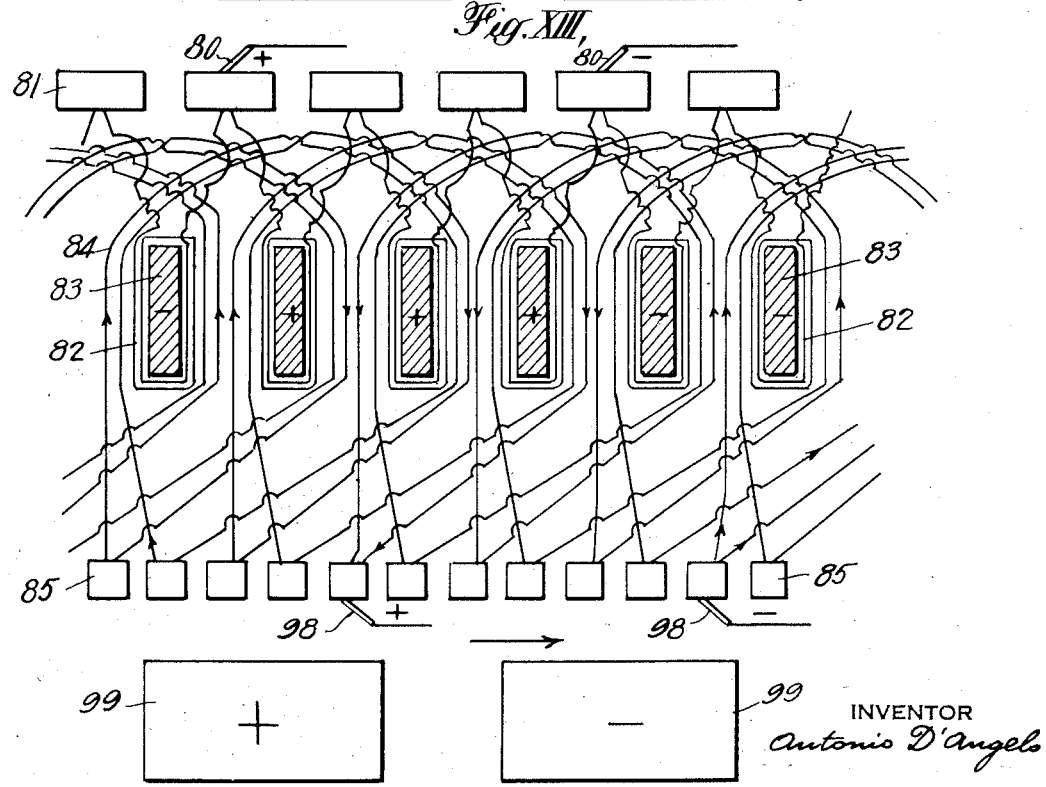

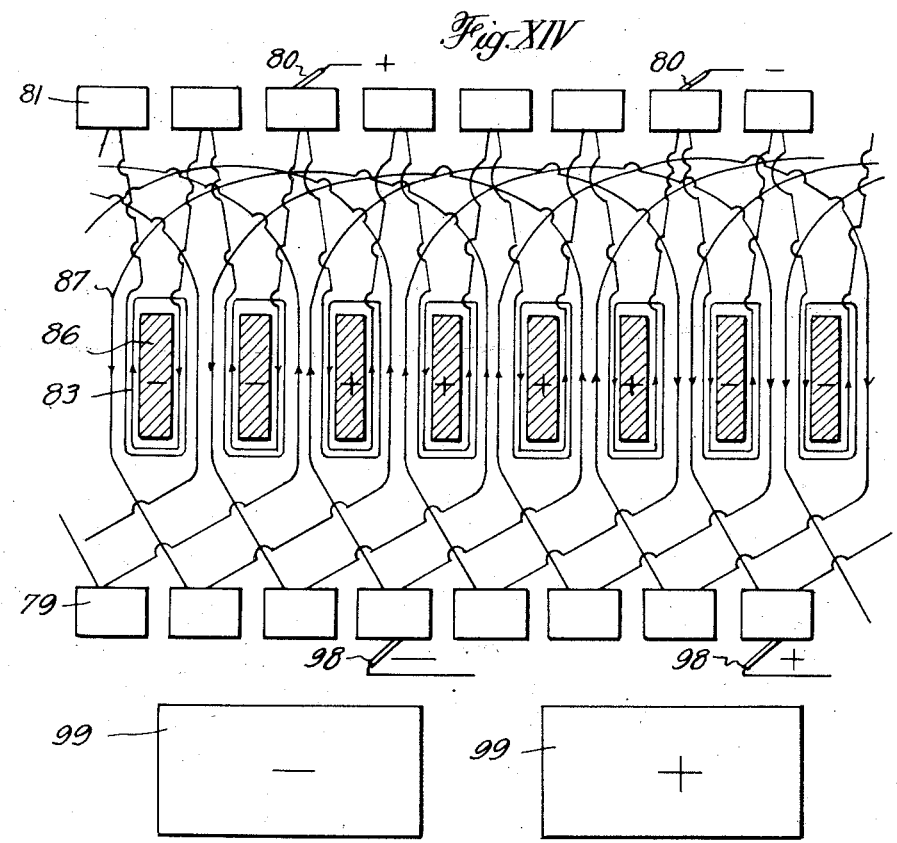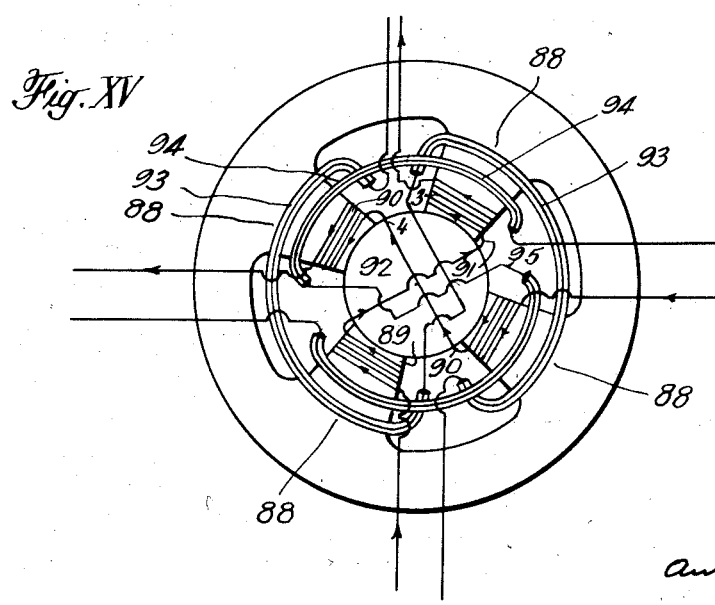

Patented Nov. 19, 1935

2,021,177

UNITED STATES PATENT OFFICE 2,021,177

MOTOR GENERATOR AND OTHER TRANSFORMER

Antonio D'Angelo, Nanuet, N. Y.

Application March 30, 1933, Serial No. 663,607
Renewed September 11, 1935

9 Claims. (Cl. 171—123)

This invention relates to means for transforming electrical energy into electrical energy of a different type, or into mechanical energy. The invention refers more particularly to electrical machines provided with a stationary or rotary pole-armature and to a new method of winding the primary and secondary circuits carried by said armature.

An object of the present invention is the provision of inexpensive, durable and reliable machines for transforming direct or alternating current into a single-phase or multi-phase alternating current or direct current of any desired voltage.

Another object is the adaptation of a machine provided with a pole-armature carrying a primary circuit and a secondary circuit for transforming direct current into a direct current of any desired voltage.

A further object is the provision of a new method for winding the secondary circuit on the pole-armature of a machine, said method resulting in an increase in electromotive forces developed in the secondary circuit.

The above and other objects of this invention may be realized through the provision of a secondary winding carried by the pole-armature and having a pitch which is different from that of the primary winding; preferably at least some of the turns of the secondary winding are wound in such a way that each of the last-mentioned turns encircles two, three or more poles of the pole-armature.

The invention will appear more clearly from the following detailed description when taken in connection with the accompanying drawings, showing by way of example only, some of the preferred embodiments of the inventive idea.

In the drawings:

Figure I shows a motor-generator partly in side elevation and partly in a longitudinal vertical section.

Figure II shows the motor-generator illustrated in Figure I in a transverse vertical section.

Figure III is a front view of the iron sheets forming the armature of the motor-generator illustrated in Figures I and II.

Figure IV shows diagrammatically the windings of the primary circuit carried by the armature.

Figure V shows diagrammatically the windings of the primary and secondary circuits carried by the armature.

Figures Va, Vb and Vc are diagrams representing the changes in the magnetic flux and the electromotive forces of the machine illustrated in Figures I to V.

Figure VI shows diagrammatically the primary and secondary circuits of a machine for transforming direct current into a direct current of a low voltage.

Figure VII shows diagrammatically a machine for producing direct current of a high voltage.

Figure VIII shows diagrammatically another machine having rotor-pole windings, which are connected with the windings of the stator poles.

Figure IX shows diagrammatically a machine for transforming alternating current into direct current.

Figure X is a transverse vertical section through a motor-generator provided with a revolving armature.

Figure XI shows diagrammatically the primary and secondary circuits of the motor-generator illustrated in Figure X.

Figures XII and XIII are diagrams illustrating two different modifications of the machine illustrated in Figures X and XI.

Figure XIV shows diagrammatically another modification of the motor-generator having a revolving armature.

Figure XV shows a stationary transformer provided with a secondary winding having a different pitch from that of the primary winding.

The motor-generator illustrated in Figures I to V of the drawings is used for transforming direct current into a two-phase alternating current; it consists of a stationary armature, or stator, having eight long and narrow poles and a rotor provided with four poles. Obviously, the number of poles may be varied at will. The stationary pole-armature is formed of insulated sheets 20 of soft iron, as shown in Figure III. The sheets 20 are carried by bolts 21 (Fig. II) passing through holes 1 (Fig. III). The stator is assembled in the usual manner. The space 3 between two adjacent stator poles 23 (Fig. III) should be wide enough to permit the insertion of the windings of the primary circuit 6 and of the secondary circuit 4.

The rotor 17 of the motor-generator is illustrated in Figures I and II of the drawings, and is provided with four poles 16. The rotor 17 is mounted on a shaft 18 and is rotatable along with this shaft. A pair of insulated slip-rings 13 and another pair of insulated slip-rings 14 are also mounted on the shaft 18, and rotate together with this shaft. The slip-rings 14 are rotatably connected at b with the pole winding 7 of the rotor 17. In the modification illustrated in the drawings, the pole windings 7 of the rotor 17 are connected in parallel with the primary windings 6 of the stator. Obviously, the windings 6 and 7 may be connected to different sources of energy or interconnected in series or in compound.

A source 22 of direct current shown diagrammatically in Figure I is connected by conductors 11 with a pair of stationary brushes 15, which press against the two rotary slip-rings 14. Thus an electrical current is sent from the source 22 to the pole windings 7 of the rotor, so that the poles 16 become magnetized and produce a magnetic field, the lines of which pass through the primary circuit 6 and the secondary circuit 4 of the stator.

A stationary commutator 9 surrounds the shaft 18 and is provided with a number of conducting segments, which are insulated from each other. A rotary brush carrier 19 is rigidly mounted on the shaft 18 and is rotatable along with said shaft. The brush carrier 19 is provided with a plurality of revolving brushes 12, which bear against the segments of the stationary commutator 9. The brushes 12 are connected at $a$ with the slip-rings 13. Stationary brushes 10, the ends of which press against the stationary slip-rings 13, are connected with the source 22 of direct current by conductors 2.

The direct current is thus sent from the source 22 through the conductors 2 and the stationary brushes 10 into the revolving slip-rings 13. From the slip-rings 13 the current passes through conductors $a$ and the revolving brushes 12 into the stationary commutator 9. Conductors 8 connect the stationary commutator 9 with the primary windings 6 of the stator.

As shown more clearly in Figure IV of the drawings, the primary windings, or the primary circuit 6, carried by the poles 23 of the stator consists of a number of coils 24. The primary windings of each pole 23 are formed of a number of coils 24, which are situated one above the other and at a certain distance from each other. Each coil 24 has two ends 8 connected to separate segments of the commutator 9.

The primary circuit 6 is wound in the following manner:

One end of a coil 24 is joined to a segment of the commutator 9. The other end of the same coil 24 is joined to an adjacent segment of the commutator 9. An end of an adjacent coil, which coil is situated either immediately below or above the first-mentioned coil on the same pole, is joined to the same segment, to which the nearest end of the first-mentioned coil is connected. This arrangement is repeated until the winding of the primary circuit 6 is completed. Segments of the commutator 9, which are connected with coils carried by one pole, are situated at a predetermined distance from corresponding segments connected with the coils carried by an adjacent pole, said distance being proportional to the angle between these two poles. After the winding of one pole has been completed, the end of the first coil of the adjacent pole is connected with that segment, which is also connected with the nearest end of one of the coils carried by the first-mentioned pole. Thus all the coils 24 carried by the pole 23 are interconnected in series. Due to this arrangement a great part of the effects of self-induction is avoided and sparking is eliminated to a remarkable extent.

The coils 24 are wound in such a manner that groups of poles are formed, which have the same sign. In the modification illustrated in Figure IV, two adjacent poles have the same sign, but the next two poles have the opposite sign. The poles 23 of the stator are thus divided into pairs of poles, each pair having a different sign from that of the adjacent pair. The direction of the current flowing through the primary winding 6 is illustrated by arrows in Figure IV. The magnetic poles 23 attract the adjacent poles 16 of the rotor 17 thus causing a rotation of the rotor 17. Since the brush carrier 19 and the slip-rings 13 and 14 are rigidly mounted on the shaft 18, they will rotate along with said shaft, so that the brushes 12 will rotate along with the rotor 17 and will slide with respect to the stationary commutator 9. While the brushes 12 pass by the segments of the commutator, they will reverse the polarity of the poles 23 of the stationary armature. Due to this arrangement the rotor 17 and the field of the stationary armature will revolve with a predetermined speed.

The arrangement of the windings of the secondary circuit 4 is diagrammatically illustrated in Figure V of the drawings. As shown in that figure, the pitch of the secondary windings is much greater than the pitch of the primary windings. The secondary circuit 4 consists of windings divided into a plurality of coils, the turns of which encircle or surround two of the poles 23. In the illustrated modification the winding is wound twice around a pair of poles. Each turn of a coil surrounds both poles, and an adjacent pair of poles is surrounded by another turn of the same winding. Since a two-phase alternating current is required at the secondary side of the machine, the secondary circuit 4 consists of two separate windings, one winding being situated at a distance of one pole from the other winding. The windings of the primary circuit 6, which is connected by conductors 8 with the stationary commutator 9, have a smaller pitch than that of the secondary windings, since the coils of the primary circuit 6 surround each pole 23.

While the magnetic field of the rotor 17 is revolving, the lines of forces of that field cut the windings of the secondary circuit 4 with the result that an electromotive force is produced in the secondary circuit 4. Another electromotive force is created in the secondary circuit 4 by the revolving magnetic field of the stator. The total electromotive force induced in the secondary circuit 4 is thus created firstly by the changing of the signs of the poles 23 of the stationary armature, and secondly, by the revolving magnetic field of the poles 16 of the rotor 17.

Since each turn of the secondary winding 4 encircles two poles 23 of the stationary armature, and since these windings fill in the space 3 between the poles 23, one coil of the secondary winding 4 is subjected to four variations of the magnetic flux in one-half cycle. This is due to the fact that the poles, which are encircled by the coils of the secondary circuit 4, form a pair, the polarity of which is reversed twice during one-half cycle: once the sign of one of the poles, forming the pair is reversed, and the second time the sign of the other pole of the pair is reversed. Consequently, the entire electromotive force caused by the continuous changing of the signs of the poles 23 of the armature, is induced four times in each coil of the secondary circuit 4 during one complete revolution of the rotor.

Figure Va illustrates diagrammatically the changes in the electromotive forces induced in the motor-generator illustrated in Figures I to V of the drawings. The electromotive force induced by the magnetic field of the rotor is represented by the outer circle; the magnetic flux varies between a positive maximum value and a negative maximum value. The values of the electromotive force created by the changes of sign of two poles encircled by a turn of the secondary winding, are represented in Figure Va by four inner circles. It should be noted that the last-mentioned electromotive force is changed twice to a positive value and twice to a negative value.

Figure Vb is a diagram of the electromotive forces, showing changes of the values thereof in the course of one revolution of the rotor. The broken curve 26 represents the electromotive force or voltage developed in the primary circuit 6. The electromotive force induced by the magnetic field of the rotor 17 in the secondary circuit 4 is represented by a sinusoidal curve 27.

The curve 27 would have represented the entire electromotive force if the machine had no primary circuit 6 at all, so that it would operate only as a dynamo. However, due to the fact that the poles 23 of the stator produce a revolving magnetic field, another electromotive force is developed within the secondary circuit 4, which is represented by the curve 28 in Figure Vb. As illustrated in that figure, the values of the electromotive force represented by the curve 28 vary from zero to a maximum value, then to zero, then again to the maximum and then again to zero, while the values of the electromotive force represented by the curve 27 vary once, from zero to a maximum and then again to zero.

These curves illustrate that the electromotive force induced by the changing of the signs of the poles 23 of the stationary armature is not reversed in the course of one-half cycle. This is caused by the fact that one and the same turn of the secondary winding is subjected to another inductive action during the same half-cycle, due to the change of the sign of the second pole of the pair of poles encircled by the turn; this sign is changed at a time when the electromotive force induced by the first pole is reversed. The combined inductive action caused by the reversal of the signs of the poles 23 is represented by the curve 28 illustrated in Figure Vb.

Due to this feature, the induced electromotive force developed in the secondary circuit is greater than that of the primary circuit, although the secondary circuit has a smaller number of conductors and turns. Another reason for the increase in voltage is that the pitch of the primary winding is much shorter than the pitch of the secondary winding. In order to enable the primary winding to develop its normal counter-electromotive force, the rotor will make more revolutions than would have to be made if a full-pitch winding were used, provided that the machine runs on direct current. A quickly rotating rotor will cut more lines of force and this will contribute to the increase of the voltage in the secondary winding. Obviously, if the machine runs on alternating current, the magnetic field must be strengthened in order to develop its normal counter-electromotive force, and this will contribute to the increase of the secondary voltage.

The diagram illustrated in Figure Vc of the drawings, is based on the generally known principles that the average voltage is proportional to the sine of the angle, through which the coil has turned from the position in which it lay across the field, and that the total amount of voltage is proportional to the rectangular area, which is equal to the sum of the areas limited by the sinuous curves, the total amount of voltage being therefore proportional to the average height of the points along that curve.

In Figure Vc the line $a'$ $b'$ represents the average voltage of the direct current flowing in the primary circuit 6. The rectangular area $a'$ $l$ $d$ $e$ is equal to the area limited by the positive portion of the curve 27 representing the positive electromotive force induced by the magnetic field of the rotor 17. The rectangular area $a'$ $c$ $h$ $d$ is the sum of the areas limited by the positive portion of the curve 28, representing the positive electromotive forces induced through the changing of the sign of a pair of stator poles 23 encircled by turns of the secondary winding.

The rectangular area $l$ $c$ $h$ $e$ is the sum of the above-mentioned two areas. Consequently, the line $c$ $l$ represents the average positive electromotive force.

In the same manner, the area $l$ $b'$ $g$ $f$ is equal to the area limited by the negative portion of the curve 27 representing the negative electromotive force induced by the rotor 17. The area $b'$ $d$ $i$ $g$ is the sum of the areas limited by the curve 28 representing the negative electromotive force induced by the change of the sign of a pair of poles 23. The area $l$ $d$ $i$ $f$ is the sum of the two above-mentioned areas, and the line $l$ $d$ represents the average negative electromotive force. The line $c$ $d$ is, therefore, proportional to the difference of potentials of a phase current generated during one cycle.

Assuming that both the primary and secondary circuits have an equal number of turns and neglecting the energy losses in the armature, the average increase in the voltage of the secondary circuit as compared to the voltage of the primary circuit, is given by subtracting the line $a'$ $b'$ from the line $c$ $d$. Since the windings of the secondary circuit 4 for all phases are exactly alike, a similar current will be generated in each phase winding; and since the two systems of windings are placed one-half cycle apart from each other, the generated current will be the usual two-phase current.

If a single-phase alternating current is desired, the second phase may be left open; it is also possible to connect the two phase windings in series.

The direction of the current flowing in the primary and secondary circuits is illustrated by arrows in Figure V of the drawings. It will be noted that at a certain time, the conductors carrying the current of one phase will have no demagnetizing effect on the poles of the armature. This takes place when the induced current flows between adjacent poles having the same polarity. This effect with those already described increases the efficiency of the described motor-generator.

The efficiency of the motor-generator may be further increased by increasing the length of the armature, since the counter-electromotive force is produced mainly by self-induction, and self-induction is proportional to the square of the number of turns.

The device illustrated in Figures I to V is used for transforming direct current into a two-phase alternating current. The modifications shown in Figures VI and VII of the drawings illustrate a motor-generator transforming direct current into a direct current of a different voltage and amperage. For that purpose two different stationary commutators are used, one of which sends the incoming current into the primary winding of the stationary armature. The second commutator is connected with the secondary winding and is used for collecting the secondary current.

Figure VI illustrates diagrammatically the windings of a machine used for the production of a direct current of a low voltage; it comprises a stationary armature having poles 32, carrying the primary circuit 33 and the secondary circuit 34. The rotor is diagrammatically represented by the rotary poles 29. The direct current is supplied by a source of energy not shown in the drawings, and flows through stationary brushes 36, which are pressed against rotary slip-rings 38. The slip-rings 38 are rigidly mounted on the rotor shaft, which is not shown in the drawings. The rotary slip-rings 38 are connected by conductors 37 with the rotary brushes 35 pressing against the segments of the stationary commutator 36. The ends of the primary circuit 33 are connected with the segments of the stationary commutator 36.

The primary circuit 33 is wound in the following manner:

The two ends of a coil surrounding one pole 32, are connected to adjacent segments. An adjacent end of a coil wound around the nearest pole is connected to the same segment, to which the nearest end of the coil carried by the first-mentioned pole is connected. This arrangement is repeated, so that the coils carried by the poles 32 and forming the primary circuit 33, are interconnected in series.

The secondary circuit 34 is wound in the following manner:

One end of a wire is connected to a segment of a second stationary commutator 39. Then the wire is led around two poles back to the commutator 39 and is connected to the adjacent segment of that commutator. Another wire is connected to the second-mentioned segment of the commutator 39, and is again led around two poles. It will be noted that each turn of the secondary winding encircles two poles 32. However, each turn is situated at a distance equal to one pole from the adjacent turn. Due to this arrangement the beginning of one turn and the end of another turn are passed along two sides of the same pole.

Rotary brushes 40 press against the segments of the stationary commutator 39 and are connected by conductors 41 with the rotary slip-rings 42. Stationary brushes 43 press against rotary slip-rings 42, and are used for collecting the secondary current.

The device illustrated in Figure VI is used for producing a direct current having a low voltage. The device illustrated in Figure VII may be used when the secondary direct current should have a higher voltage. The same parts are indicated by the same numerals in the figures.

It will be noted that the secondary circuit 44 shown in Figure VI is wound in such a way that each turn or coil surrounding a pair of adjacent poles is connected to two adjacent segments of the commutator 39. This is done, because if the voltage is small the self-induction will not have a serious disturbing effect during the commutation of the current.

Figure VII shows diagrammatically the system of secondary windings for generating a high-voltage direct current. To prevent sparking, the commutator 46 is divided into a large number of segments. The secondary circuit 44, consists of a number of windings surrounding a pair of adjacent poles, each winding being subdivided into a plurality of separate turns, the turns of the same windings surrounding the same pair of poles. As shown in Figure VII the adjacent ends 45 of the turns forming one winding, are connected to separate adjacent segments of the commutator 46. If, for instance, a winding surrounding two adjacent poles consists of three separate turns, then one turn of that winding is connected to the first and third segments of the commutator 46. The second turn of the same winding is then connected to the second and fourth segments of the commutator 46. The third turn of the same winding is connected to the third and fifth segments of the commutator 46.

This arrangement is repeated until all the turns of the secondary winding are connected with the commutator 46. The machine operates in substantially the same manner as that illustrated in Figure VI.

Figure VIII illustrates an arrangement used when a series-wound field is desired. The rotor of a machine is provided with a number of poles 47 having a pole-winding 48. The shaft of the rotor, which is not shown in the drawings, carries a pair of slip-rings 49 and 50, which are rotatable along with this shaft. The machine is also provided with two rotary brushes 51 and 52. The rotary brush 51 is electrically connected with the slip-ring 49, while the rotary brush 52 is electrically connected with the end 53 of the rotor-pole winding 48. The other end 54 of the rotor-pole winding 48 is connected with the rotary slip-ring 50. Stationary brushes 55 press against the slip-rings 49 and 50.

The stationary armature comprises a number of poles 57 carrying the primary circuit 56, which consists of a number of coils, each one of which surrounds a separate pole 57. The adjacent ends of two adjacent coils are connected to the same segment of a commutator 95. The secondary circuit 58 consists of two phase-windings, each one of which comprises a number of turns encircling adjacent poles 57. One turn, surrounding a pair of poles forms a continuation of another turn surrounding a pair of adjacent poles. It will be noted that the pole-winding 48 of the rotor 47 is connected in series with the pole-winding 56 of the stator.

It is obvious that a compound winding may also be used by combining this winding in series with the winding in parallel described in connection with the machine illustrated in Figures I to V of the drawings.

This machine may be used as an ordinary electric motor, irrespective as to whether the windings creating the magnetic field are excited separately or are wound in parallel, or in series, or are compound wound. To use the machine as a motor, the secondary circuit may be left open, or it may be omitted altogether. The torque of this motor is due to the magnetic pull between the poles of the stator and the poles of the rotor.

Figure IX illustrates a rotary transformer used for transforming a two-phase alternating current into a direct current. The pole winding 59, which transmits the primary alternating current, is carried by the poles 60 of the stationary armature; two coils carried by separate poles are connected with each other and the ends of these coils are joined to a source of current not shown in the drawings. The coils are wound in uniform layers, each coil having the same number of turns. One coil carried by one of the poles 60 is connected with another coil carried by a pole which is situated at a distance of one-half cycle from the first-mentioned pole.

The secondary winding 61 consists of turns, each one of which encircles two adjacent poles. The turns are connected to segments of a commutator 62, in such a way that all turns appear to be interconnected in series. Rotary brushes 65 are connected with rotary slip-rings 64 carried by the rotor shaft, which is not shown in the drawings. Stationary brushes 63 press against the slip-rings 64 and collect the direct current passing through these slip-rings.

The primary alternating current creates a revolving magnetic field, which will attract or repulse the poles 96 of the rotor, so that the rotor will be caused to rotate. The rotary field of the stationary armature and the magnetic field of the rotor will produce an electromotive force in the secondary circuit with the result that an alternating current will flow through these windings and will be transformed into a direct current by the commutator 62.

Due to this arrangement alternating current of a very high voltage, for instance 12000 volts, may be transformed into direct current of a very low voltage, for instance 25 volts, without the necessity of using any auxiliary devices.

The machine illustrated in Figure IX may be used as a synchronous alternating current motor. This is accomplished by leaving the secondary circuit open, or by omitting the secondary circuit altogether.

Instead of providing a stationary armature and a rotating magnetic field, it is obviously possible to construct a rotary armature and stationary magnets. This arrangement is illustrated in modifications described in Figures X to XIV.

Figures X and XI show a motor-generator provided with a rotating armature carrying the primary and secondary circuits and used for generating a three-phase alternating current. The stator 66 is provided with four elongated poles 97 carrying a pole winding 68. The rotor carries twelve long and narrow poles 67 provided with a pole winding 69. The winding 69 is arranged in such a manner that the twelve poles 67 of the rotor are divided into groups of three poles each, poles of the same group having the same sign, although this sign is different from that of the poles of the adjacent groups.

Obviously, the number of the poles of the stator and the rotor may be varied at will.

A commutator 70, consisting of a number of segments, is mounted on the shaft of the rotor and is rotated along with that shaft. The pole winding 68 of the stator poles 97 may be excited separately or may be interconnected in any suitable manner. The primary circuit 69 carried by the rotor poles 67 is connected with the segments of the rotary commutator 70 (Fig. XI).

The end of each coil, carried by a separate pole 67, is connected to the same segment, to which the adjacent end of the coil carried by the adjacent pole is connected. The winding of the primary circuit 69 is substantially the same as that of the machine illustrated in Figures I to V of the drawings.

The direct current is supplied by a source of energy not shown in the drawings. The stationary brushes 71, press against the segments of the rotary commutator 70. The current flowing through the rotor-pole winding or primary winding 69, creates a magnetic field, which will cut the lines of the magnetic field created by the poles 97 of the stator. The resulting repulsion or attraction will cause the rotation of the armature.

The polarity of the poles 67 of the rotor will be reversed when the stationary brushes 71 will come in contact with other segments of the commutator 70. Thus the rotor will be driven steadily and continuously by the magnetic forces.

The secondary circuit, carried by the rotor consists of three separate windings 72, 73, and 74. In the course of the rotation of the rotor, these windings will cut the lines of the magnetic field created by the stationary poles 97, with the result that an electromotive force will be induced in these windings. The electromotive force will be increased by other electromotive forces caused by the continuous changing of the polarity of the poles 67 of the armature.

Since the windings of the secondary circuit consist of three groups situated at a distance of one third of a cycle from each other, the current flowing through them will be the usual three-phase alternating current. The three phase windings 72, 73, and 74 may be joined at 76, to form a star-connection. The current flowing through the secondary circuit is collected by stationary brushes 98 pressing against the rotating slip-rings 75 (Fig. X), which are mounted on the shaft of the rotor. As shown in Figure XI, each secondary winding is formed by passing a wire twice around a group of three poles 67 and then winding it twice around the adjacent group of three poles. Obviously each phase winding may consist of any desired number of turns.

The electromotive forces induced in the secondary circuit are substantially similar to those developed in the secondary circuit of the machine illustrated in Figures I to V of the drawings. The two electromotive forces produced by the magnetic field of the stator 66 and by reversing the polarity of the rotor poles 67 are added to each other. In this machine also there is a time, during which the electric current flowing through the secondary circuit will have no demagnetizing effect on the pole winding 69. This occurs when the secondary current is flowing between poles having the same polarity as shown by arrows in Figure XI.

Figure XII shows a modified form of the machine illustrated in Figures X and XI of the drawings. The machine shown in Figure XII may be used for transforming a direct current into another direct current of any desired voltage and amperage. The direct current on the primary side is supplied by a source of energy not shown in the drawings, to a pair of stationary brushes 80. The brushes 80 are in contact with the segments of a rotary commutator 81. The revolving armature of this machine is provided with a number of poles 83 carrying a pole winding 82. The pole winding 82 is divided into a number of coils, each coil being carried by a separate pole 83. The end of each coil is connected to that segment of the commutator 81, to which the adjacent end of the coil carried by the adjacent pole is connected. Due to this arrangement, the various coils forming the primary circuit 82 are connected in series with each other.

The secondary circuit 78 consists of a number of windings joined to the segments of another revolving commutator 79. In the modification illustrated in Figure XII, each turn of the secondary winding encircles three poles 83. One end of a turn is connected to one segment of the commutator 79, while the other end of the same turn is connected to the adjacent segment of the commutator 79. The adjacent end of the next turn is connected to the second-mentioned segment of the commutator 79, while the other end of that turn is connected to the third segment of the commutator. Stationary brushes 98 press against the segments of the commutator 79 and are used for collecting the secondary current. The stationary magnetic field is indicated diagrammatically by the two poles 99.

The machine illustrated in Figure XIII is used for generating a current of a high voltage. This machine is somewhat similar to that shown in Figure XII, the main difference consisting in the use of a secondary circuit 84 wound in a different way, and in the provision of a rotary commutator 85 having a large number of segments. The secondary circuit 84 consists of a large number of separate windings, each turn of a winding encircling a group of three adjacent poles. One end of a turn, encircling three poles, is joined to one segment of the commutator 85, while the other end of the same turn is joined to the adjacent segment of the commutator 85. The adjacent end of a second turn is joined to the second-mentioned segment of the commutator 85 and then the wire is wound around the same poles around which the first-mentioned turn was wound. The other end of the second-mentioned turn is joined to the third segment of the commutator 85. The next two turns are wound around a group of three poles, two of which are the poles belonging to the first-mentioned group.

The machine operates in substantially the same manner as that illustrated in Figure XII. The direct current of the primary circuit passes through stationary brushes 80 and through the rotary commutator 81 into the pole winding 82. Due to the rotation of the commutator 81, the direction of the current will be reversed in the course of the rotation of the armature, with the result that an electromotive force will be induced in the secondary circuit 84. The magnetic field created by the stationary poles 99 will produce another electromotive force in the secondary circuit 84, and the two electromotive forces will be added to each other. The secondary current will be collected from the commutator 85 by the stationary brushes 98.

Figure XIV shows a secondary circuit 87 consisting of windings encircling groups of four poles. After one end of a turn has been joined to a segment of the commutator 79, the wire is passed around four poles and the other end of this turn is joined to the adjacent segment of the commutator 79. The end of the next turn is joined to the third segment of the commutator 79. Then this wire is passed around four poles, three of which were surrounded by the first-mentioned turn, and the other end of the second-mentioned turn is joined to the fourth segment of the commutator 79.

The primary direct current is supplied from a source of energy not shown in the drawings to stationary brushes 80, which press against the rotary commutator 81. The current passes through the primary winding 83 and the direction of the current is reversed in the course of rotation of the commutator 81. The secondary current is induced in the secondary circuit 87 by the stationary magnetic field 99 and the continuous reversal of the signs of the poles 86. The secondary current is collected by the brushes 98 pressing against the segments of the rotary commutator 79.

The above-described machine may be used as an ordinary motor by leaving open the secondary circuit, or by omitting this secondary circuit altogether.

Figure XV shows diagrammatically a stationary transformer constructed in accordance with the principles of this invention and used for transforming a two-phase alternating current. This transformer is formed of insulated soft-iron sheets 88 provided with concentric projections or poles 89, which project towards the center of the device. The primary circuit 90 is formed of a plurality of uniform layers of conductors wound on each of the poles 89 and connected in such a way that one end 91 of a coil is connected with the end of a coil carried by a pole situated in the opposite quadrant. The space between the poles 89 is filled by a central part 92, which consists of laminated iron and which fits snugly between the ends of the poles 89.

The secondary circuit consists of two separate windings 93 and 94, each of said windings encircling two poles of the transformer. The end 95 of one winding is connected with the end of a winding situated on the opposite side of the transformer.

Due to this arrangement, each of the secondary windings is subjected to the variations of the magnetic flux produced by the two-phase alternating current supplied to the primary winding 90. Each winding is subjected to two inductive actions of the phases. Consequently, there are four inductions for each winding in one cycle. The efficiency of this transformer is quite high, and this is caused particularly by the joint effect of the overlapping electromotive forces.

Having fully described the structure, the system and function of my electrical apparatus, I claim as my invention:

1. In combination, a stationary armature having a plurality of poles, a pole winding for said poles, a stationary commutator having segments connected with the ends of said pole winding, means in contact with said commutator for supplying a current thereto, a secondary winding carried by said stationary armature, each one of at least some of the turns of said secondary winding surrounding a plurality of said poles, a rotor having a plurality of poles, a pole winding for the poles of the rotor, and means connected with the second-mentioned pole winding for supplying a current thereto.

2. In combination, a stationary armature having a plurality of poles, a separate pole winding carried by each of said poles, a stationary commutator having segments connected with said pole winding, a rotor having a plurality of poles, a shaft carrying said rotor and rotatable therewith, a current-transmitting device mounted on and rotatable along with said shaft and having brushes pressing against said commutator, stationary brushes in contact with said current-transmitting device, a secondary circuit carried by said stationary armature, said secondary circuit consisting of a plurality of separate coils, each turn of a coil surrounding at least two of the first-mentioned poles; a pole winding for the poles of the rotor, slip-rings mounted on and rotatable along with said shaft, said slip-rings being connected with the second-mentioned pole winding, stationary brushes in contact with said slip-rings, and a source of direct current connected with the first-mentioned and the second-mentioned stationary brushes.

3. In combination, a stationary armature having a plurality of poles, a separate pole winding carried by each of said poles, a stationary commutator having segments connected with said pole winding, a rotor having a plurality of poles, a shaft carrying said rotor and rotatable therewith, a current-transmitting device mounted on and rotatable along with said shaft and having brushes pressing against said commutator, stationary brushes in contact with said current-transmitting device, a pole-winding for the second-mentioned poles, slip-rings mounted on and rotatable along with said shaft, said slip-rings being connected with the second-mentioned pole winding, stationary brushes in contact with said slip-rings, and a source of electrical energy connected with the first-mentioned and the second-mentioned stationary brushes.

4. In combination, a stationary armature of laminated soft iron and having a plurality of poles, a stationary commutator, a separate pole-winding carried by each of said poles, the winding of each pole consisting of a plurality of coils separated from each other and having separate ends connected to the segments of said commutator; a rotor having a plurality of poles, a shaft carrying said rotor and rotatable therewith, a current-transmitting device mounted on and rotatable along with said shaft and having brushes pressing against said commutator, stationary brushes in contact with said current-transmitting device, a pole winding for the second-mentioned poles, slip-rings mounted on and rotatable along with said shaft, said slip-rings being connected with the second-mentioned pole winding, stationary brushes pressing against said slip-rings, and a source of electrical energy connected with the first-mentioned and the second-mentioned stationary brushes.

5. In combination, a stationary armature of laminated soft iron and having a plurality of poles, a stationary commutator, a separate pole winding carried by each of said poles, the winding of each pole consisting of a plurality of coils separated from each other and having separate ends connected to the segments of said commutator; a rotor having a plurality of poles, a shaft carrying said rotor and rotatable therewith, a current-transmitting device mounted on and rotatable along with said shaft and having brushes pressing against said commutator, stationary brushes in contact with said current-transmitting device, a secondary winding carried by said stationary armature, said secondary winding consisting of a plurality of separate coils, each turn of a coil surrounding at least two of the first-mentioned poles; a pole winding for the second-mentioned poles, slip-rings mounted on and rotatable along with said shaft, said slip-rings being connected with the second-mentioned pole winding, stationary brushes pressing against said slip-rings, and a source of current connected with the first-mentioned and the second-mentioned stationary brushes.

6. In combination, a stationary armature having a plurality of poles, a separate pole-winding carried by each of said poles, a stationary commutator having segments connected with said pole winding, a rotor having poles providing a magnetic field, a rotary current-transmitting device adapted to be connected with a source of current and having brushes in contact with said commutator, a secondary winding, at least some of the turns of said secondary winding surrounding a plurality of the first-mentioned poles, another stationary commutator, the turns of said secondary winding being connected with the segments of the second-mentioned commutator, and a rotary current-collecting device having brushes in contact with the second-mentioned commutator.

7. In combination, a stationary armature having a plurality of poles, a pole winding carried by said poles and adapted to be connected to a source of electrical energy, a secondary winding, a stationary commutator having segments connected with the turns of said secondary winding, said turns encircling a plurality of said poles, and a current-collecting device having brushes in contact with said commutator.

8. In an electric machine, an armature having poles, a pole winding for said poles, another winding carried by said armature, each one of at least some of the turns of the second-mentioned winding surrounding a plurality of said poles, other poles, another pole winding for the second-mentioned poles capable of energizing the second-mentioned poles to provide a magnetic field, means providing a relative movement between the second-mentioned winding and the second-mentioned poles, and means connected with the first-mentioned pole winding for providing a revolving magnetic field, the second-mentioned winding being within both said magnetic fields.

9. In an electric machine, a set of poles, another separate set of poles, a pole winding for the first-mentioned set of poles, another pole winding for the second-mentioned set of poles, means connected with the first-mentioned pole winding for providing a revolving magnetic field, means connected with the second-mentioned pole winding for providing a magnetic field, another winding, each one of at least some of the turns of the last-mentioned winding surrounding a plurality of poles of the first-mentioned set of poles, and means providing a relative movement between the second-mentioned set of poles and the last-mentioned winding, the last-mentioned winding being situated within said two magnetic fields.

ANTONIO D'ANGELO.